April 7, 1936.     F. R. SWANSON     2,036,240
WORK SUPPORT
Filed Feb. 2, 1934     2 Sheets-Sheet 1

April 7, 1936.  F. R. SWANSON  2,036,240
WORK SUPPORT
Filed Feb. 2, 1934  2 Sheets-Sheet 2

Inventor:
Fred R. Swanson
By Axel E. Hofgren
His Atty.

Patented Apr. 7, 1936

2,036,240

UNITED STATES PATENT OFFICE 2,036,240

WORK SUPPORT

Fred R. Swanson, Rockford, Ill., assignor to Sundstrand Machine Tool Co., Rockford, Ill., a corporation of Illinois Application February 2, 1934, Serial No. 709,436

15 Claims. (Cl. 90—16)

More particularly the invention relates to improvements in work carriers and supporting means therefor.

It is an object of the invention to provide a new and improved work supporting means particularly adapted for machine tools of the continuous operation type wherein a plurality of carriers are provided so that while tools are operating upon work pieces carried by one or more carriers, additional carriers may be unloaded of finished work pieces and reloaded with work blanks.

Another object is to provide, in a machine embodying a plurality of work carriers connected in a continuous chain, new and improved means for supporting and alining the work carriers during the cutting operation.

Another object is to provide in a milling machine or the like, a pair of laterally spaced cylindrical bars extending longitudinally of the bed under the cutter arbor, means for supporting the bars so that portions of the periphery thereof form slideways, and one or more work carriers having longitudinally extending grooves forming curved surfaces adapted to engage the slideways, thereby to guide the carrier or carriers.

Another object is to provide, in a machine of this character, a work carrier embodying new and improved means for clamping the work pieces on the carrier.

Further objects and advantages will become readily apparent from the following detailed description taken in connection with the accompanying drawings, in which.

Figure 1:
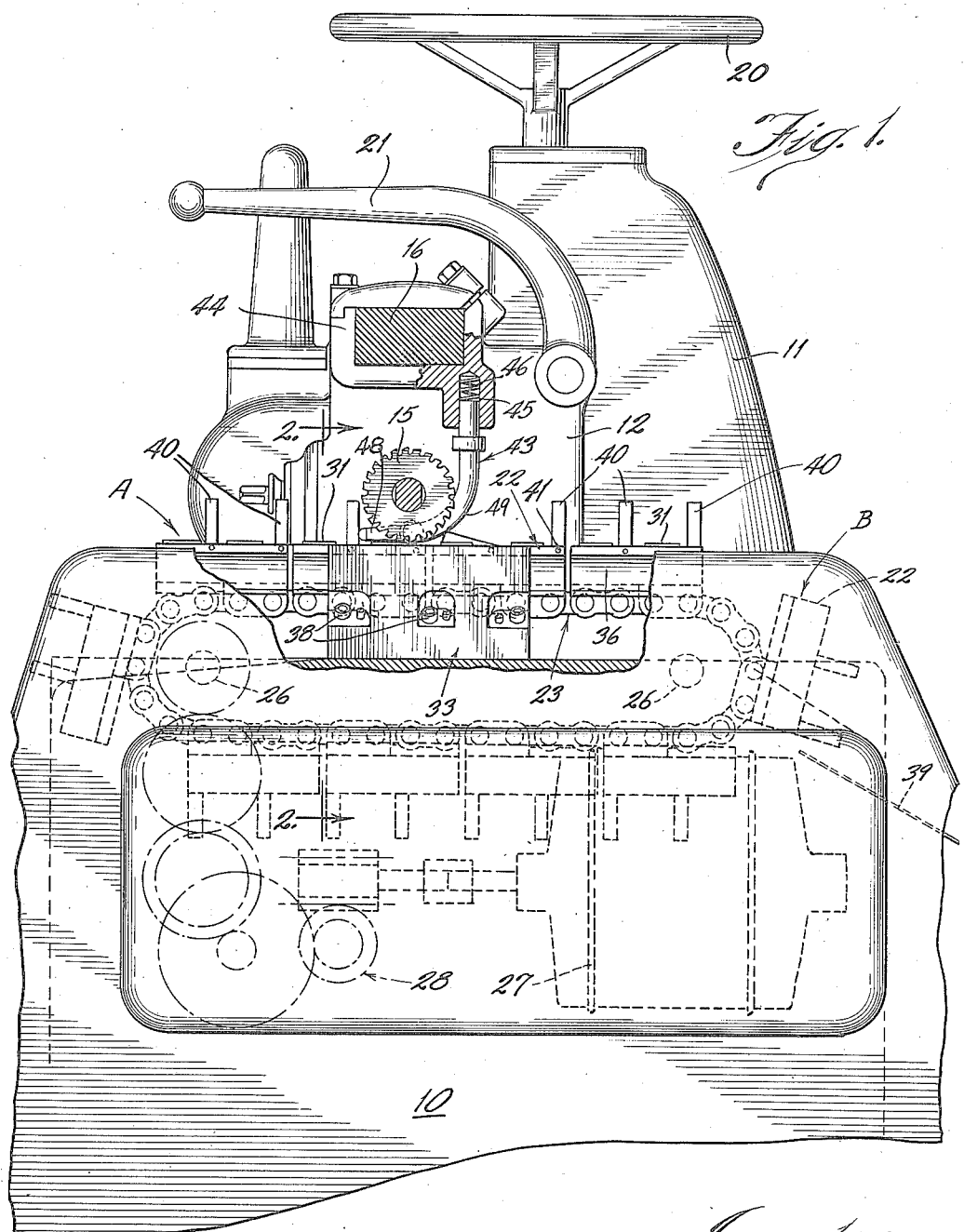
Fig. 1 is a fragmentary front elevation of a milling machine embodying a preferred form of the invention, partly in section along the line 1—1 of Fig. 2.

While I have illustrated in the drawings and shall herein describe a preferred form of the invention embodied in a milling machine, it is to be understood that I do not thereby limit the invention to the specific form and arrangement shown, it being contemplated that those skilled in the art may readily adapt the invention in its present or modified forms for other machine tools without departing from the spirit and scope of the appended claims.

In the drawings 10 represents the bed of a milling machine, a column 11 projecting upwardly from the bed so as to support a vertically movable head 12. This head carries a rotatably mounted spindle 13 on an axis extending transversely of the bed, which spindle is adapted to support an arbor carrying cutters 14 and 15. Preferably an overarm 16 extends forwardly from the head 12 and carries an outboard bearing 17 for the cutter arbor. The head 12 may be adjusted vertically of the column 11 by means including a hand wheel 20 and may be clamped in its adjusted position by means including a lever 21. Since the particular form of these parts of the machine is not pertinent to the present invention, they will not be described in detail.

A continuous milling operation is attained with the present machine through the provision of a plurality of work carriers 22, which are linked together by means such as a continuous chain 23, and mounted on the bed 10 of the machine for successive movement longitudinally of the bed beneath the arbor. To support and drive the chain 23 and the associated carriers 22, pairs of sprockets 24 are mounted on transverse shafts 26 at opposite ends of the bed, and movement being imparted to the chain 23 by means of such a motor 27, mounted in the bed and acting through suitable reduction gearing 28 to drive the sprockets 24 at one end of the bed. The chain 23, as shown, is of the roller type, with side links 29 extending between the transverse rollers, and the carriers 22 are shown secured on alternate links 29 so as to permit flexure of the chain, the carriers being long enough to overlap two links. Each carrier 22 preferably comprises a relatively flat block secured by angles 30 adjacent its forward or leading edge to a pair of corresponding links 29 of the chain.

In the embodiment illustrated, the machine is adapted for milling the longitudinal edges of split or half bearing sleeves 31, two such work pieces being milled simultaneously upon both longitudinal edges through the provision of two cutters 14 and two cutters 15 in axially spaced relation on the arbor. Thus the work pieces are moved along the bed in two rows, and the work carriers 22 are each adapted to support four such work pieces disposed in two transverse rows of two each. The work pieces are positioned on the carriers in suitable pockets or recesses 32 formed in the upper surface of the carrier and adapted to receive the work.

Figure 2:
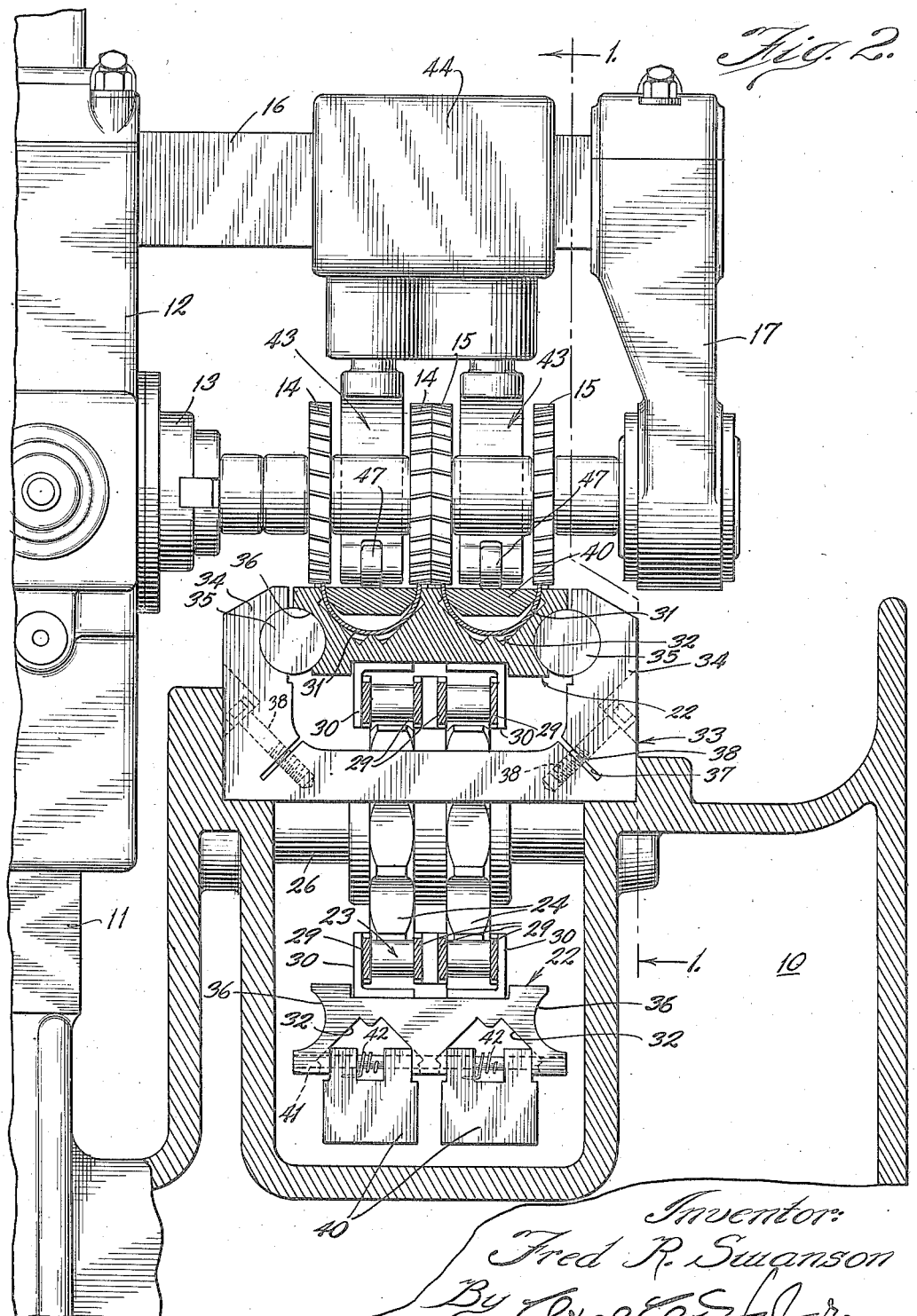
Fig. 2 is a fragmentary vertical section approximately along the line 2—2 of Fig. 1.

During its movement beneath the cutters 14 and 15, each carrier is supported and guided in a predetermined relation to the cutters. Such support is herein provided by a channel-shaped support 33 fixed on the bed beneath the arbor so that the carriers 22 travel longitudinally through the channel between upstanding side walls 34 thereof. On the side walls 34 of the support 33, a pair of cylindrical bars 35 are horizontally mounted to serve as slideways for engagement by arcuately shaped seats 36 formed in the opposite edges of the carriers 22. As shown in Fig. 2, the cylindrical bars project laterally toward each other from the side walls 34, and the seats 36 embrace both upwardly and downwardly facing surfaces thereof so that the carriers are held against both upward and downward movement as well as sideward movement during the cutting operation. The support 33 and the bars 35 preferably extend but a short distance on each side of the arbor as shown by the length of the support 33 in Fig. 1, and since the bars 35 are supported solely along their outer sides rather than at their ends, a clear path is provided for movement of the carriers 22 beyond the ends of the bars. This construction permits the carriers to be moved successively from the bars at their right ends (Fig. 1) and to be engaged successively with the bars at their other ends. To facilitate such engagement of the carriers with the bars, the ends of the seats 36 or the bars may be chamfered in a conventional manner.

At the base of its side walls 34, the support 33 is formed with longitudinal slots 37 which extend outwardly and downwardly at an angle from the inner surface of the walls so as to permit slight inward flexure or bending of the side walls 34 for the purpose of adjusting the lateral spacing of the bars 35 and thereby compensate for wear. Such adjustment is preferably effected by a plurality of screw devices 38 extending through bores in the walls 34 and into screw threaded engagement with the lower portion of the support 33, at substantially right angles to the slots and at longitudinally spaced points along the support. These screw devices are operable when tightened to cause inward bending of the walls 34.

In the operation of the machine, the work pieces or blanks 31 are loaded upon the carriers 22 at the point A (Fig. 1) with their longitudinal edges projecting upwardly from opposite sides of the recesses 32 parallel to the path of movement of the carriers, and after the milling operation, the finished work pieces are discharged automatically from the carriers at the point B into a chute 39.

To attain this operation, a plurality of shiftable clamps 40 are provided, one for each recess 32, together with means for automatically engaging the clamps with the work pieces during the milling operation. In the form shown, each clamp 40 comprises a member pivoted on a horizontal pin 41 a short distance forwardly of the leading edge of its recess 32. The clamps 40 may be pivoted to the horizontal position shown in Fig. 2 (upper carrier) wherein its curved side edges engage the inner surface of the work piece and hold the same firmly in position. To facilitate the loading and unloading of the work pieces, the clamps 40 are normally held in their upstanding or released positions of Fig. 1 by means of springs 42 (Fig. 2, lower carrier), and are held in clamped position only during the cutting operation.

Clamping movement of the clamps 40 is automatically attained by a pair of pressure members 43, one extending downwardly over each row of clamps from a head 44 on the overarm 16 and projecting beneath the arbor for engagement with the clamps as they move beneath the cutters. Each pressure member 43 at its upper end is slidable vertically in a socket 45 in the head 44, and is urged downwardly by an expansive spring 46 in the socket so as to urge a roller 47 at the lower end of the pressure member into firm engagement with the clamps. Preferably the pressure members 43 are located on the remote side of the arbor with relation to the advancing clamps 40 so that the clamps remain open as long as possible, thereby affording ample time for the loading operation as the carriers advance from the sprockets 25 to the cutters.

The clamps 40 in the form illustrated are slightly wider than the space between the cutters 14—14 and 15—15, and means is provided for controlling the position of the clamps immediately preceding and following the cutting operation so as to prevent contact of the clamps with the cutters. Such control prior to the cutting operation is preferably attained by forming the pressure members 43 with arms 48 projecting horizontally therefrom at one side of the rollers 47 toward the advancing clamps 40, the length of the arms 48 being such that the clamps are engaged and pivoted downwardly before they reach the adjacent edges of the cutters. As the clamps 40 continue their movement, they are engaged by the pressure rollers 47 so as to be held in their effective positions during the cutting operation. Passing from beneath the rollers 47, the free edges of the clamps 40 are shifted upwardly by their springs 42 into contact with a curved lower guide surface 49 formed on the pressure members 43, this surface being formed so as to maintain the clamps out of contact with the cutters. Thus while the pressure rollers 47 act on one pair of clamps 40 during the performance of a cutting operation, the other portions of the pressure members 43, namely, the arms 48 and the guide surface 49 act on and control the positions of the two adjacent pairs of clamps.

In the operation of the machine the motor 27 generally runs continuously so that the work carriers pass in steady succession past the cutters. When looking at Fig. 1, an operator is generally positioned at the left-hand end so as to be in a position to load work blanks at the point A onto the carriers, the clamps 40 being held in their raised or open positions by means of the springs 42. As the loaded work carriers pass onto the ways formed by the bars 35 and proceed along the ways, the arms 48 engage the clamps and pivot them counterclockwise out of the way of the cutters 14 and 15 and into engagement with the work blanks. During the cutting operation the clamps are maintained in their clamping positions by means of the rollers 47. After the cutting operation is completed, the clamps 40 are returned to their open positions as shown in the right-hand portion of Fig. 1, and as the carriers move downwardly over the right hand sprockets 24 the finished work pieces are discharged by gravity onto the chute 39. It will be readily apparent that the operation of the machine is continuous and that it is merely necessary for the operator to place additional work blanks on the carriers as they assume a horizontal position at the left-hand end of the machine. The carriers move automatically into engagement with the ways formed by the bars 35 and are effectively guided thereby during the cutting operation against movement crosswise of the longitudinal path of the carriers. The actual clamping of the work pieces is accomplished automatically and so is the releasing of the finished work pieces.

I claim as my invention:

1. In a milling machine having a bed and a cutter arbor rotatably mounted on an axis extending over said bed, a channel shaped member secured to the top of said bed and extending longitudinally thereof under said arbor, a pair of cylindrical bars mounted along the upstanding portions of said channel so as to form slideways, a plurality of work carriers having seats along the opposite sides thereof conforming in shape to said bars so that said carriers may slide thereon, means for joining said carriers in a continuous chain, means for supporting and driving said chain, work clamping members pivotally mounted on said carriers, and means for automatically engaging said clamping members with work pieces on the carriers during a cutting operation.

2. In a milling machine having a bed and a cutter arbor rotatably mounted on an axis extending over said bed, a channel shaped member secured to the top of said bed and extending longitudinally thereof under said arbor, a pair of cylindrical bars mounted along the upstanding portions of said channel so as to form slideways, a plurality of work carriers having seats at the opposite sides thereof conforming in shape to said bars so that said carriers may slide thereon as they pass under the cutter arbor, means for joining said carriers in a continuous chain, means for supporting and driving said chain, and means operable to adjust said bars toward and away from each other.

3. In a machine tool having a bed and a tool arbor rotatably mounted on an axis extending over said bed, a channel shaped member mounted on said bed and extending longitudinally thereof under said arbor, a pair of bars mounted along the upstanding portions of said channel and having cylindrical surfaces so as to form slideways, a plurality of work carriers having seats at opposite sides thereof conforming in shape to said bar surfaces so that said carriers may slide longitudinally thereon, means for joining said carriers in a continuous chain, means for supporting and driving said chain, and clamping means extending angularly across the lower corners of said channel shaped member and operable when tightened to distort the upstanding portions of said member and thereby adjust said bars toward and away from each other.

4. In a milling machine having a bed and a cutter arbor rotatably mounted over said bed, a pair of transversely spaced cylindrical bars extending longitudinally of the bed beneath said arbor, a carrier shaped at its edges to conform with arcuate portions of the surfaces of said bars so as to be guided longitudinally along said bars and prevented from moving transversely thereof, and channel shaped supporting means mounted on the bed engaging said bars at other side portions thereof and providing a clear path along which said carrier may be moved longitudinally onto and off of the ends of said bars.

5. In a milling machine having a bed and a cutter arbor rotatably mounted on an axis extending over said bed, a slideway extending longitudinally of said bed under the arbor, a plurality of work carriers each having a work receiving position thereon and adapted to slide along said slideway, means for joining said carriers in a continuous chain, means for supporting and driving said chain, a work clamping member mounted on each of said carriers for pivotal movement about an axis located forwardly of the leading edge of said work receiving position of the carrier, and means for automatically pivoting said members rearwardly into clamping engagement with the work pieces on the carriers during the cutting operation.

6. In a machine tool having a bed, a column, a rotatable cutter arbor and an overarm extending over said bed from said column, a guideway extending longitudinally of the bed, a plurality of work carriers adapted to slide along said guideway, means for moving said carriers along said guideway, shiftable work clamping members on said carriers, and means carried by said overarm and acting automatically to render said clamping members effective during the cutting operation.

7. In a machine tool having a bed and a rotatable cutter arbor extending over said bed, a guideway extending longitudinally of the bed, a plurality of work carriers shaped to conform with and slide along said guideway, means for supporting and actuating said carriers to move the same along said guideway beneath the arbor, work clamping members pivoted on said carriers on axes extending transversely of the carriers and adjacent to the leading edges thereof, and a pressure member extending beneath the arbor operable to pivot said clamping members to their clamped positions and to maintain the clamped relation thereof during the cutting operation.

8. A work carrier having seats along the opposite sides thereof for engaging a slideway, means on the carrier for supporting and positioning a work piece thereon, a clamp pivoted on said carrier adjacent to said work-positioning means and adapted to be pivoted into overlying relation to said means and to a work piece in position thereon, and yielding means normally urging said clamp to a released position.

9. In a milling machine having a bed and a cutter supported over said bed, a carrier, means for supporting and guiding said carrier along said bed beneath the cutter, a shiftable clamp on said carrier for securing a work piece thereon, spring means urging said clamp to a normal upstanding position, and means operable to shift the clamp out of the way of the cutter during movement of the carrier and to press the clamp into its clamping position during the cutting operation.

10. In a milling machine having a bed, a support extending upwardly from the bed, and a cutter arbor rotatably mounted in said support and extending over said bed, a slideway on said bed extending longitudinally thereof, a carrier adapted for movement along said slideway beneath said arbor, work supporting and positioning means on said carrier, a clamp on said carrier shiftable into overlying relation to said means and to a work piece in position on said supporting and positioning means, and a pressure member mounted on said support in overlying relation to said carrier and operable directly to engage and to hold said clamp in its clamped position during a cutting operation.

11. In a milling machine having a bed, an arbor over said bed and a cutter on said arbor, a carrier, means on said bed for supporting and guiding said carrier for movement beneath said cutter, a normally open clamp pivoted on said carrier for securing a work piece in position thereon, a pressure member extending downwardly on one side of the arbor at one side of the cutter, and a pressure roller on said member beneath said arbor to press said clamp to its effective position during the cutting operation.

12. In a machine tool having a bed and a tool arbor rotatably mounted on an axis extending over said bed, a channel shaped member having a horizontal and upstanding portions mounted on said bed and extending longitudinally thereof under said arbor, a pair of bars mounted along the upstanding portions of said channel and having cylindrical surfaces exposed to form slideways, a plurality of work carriers having seats at opposite sides thereof conforming in shape to said bar surfaces so that said carriers may slide longitudinally thereon, means for joining said carriers in a continuous chain, means for supporting and driving said chain, slots in said channel member between the horizontal and the upstanding portions, and bolts extending angularly across the slots and threaded in the channel member operable when tightened to distort the upstanding portions of said member and thereby adjust said bars toward or away from each other.

13. In a milling machine having a bed, an arbor over said bed and a cutter on said arbor, a carrier, means on said bed for supporting and guiding said carrier for movement beneath said cutter, a normally open clamp pivoted on said carrier to overlie a work piece to secure the same in position on the carrier, a pressure member extending downwardly on one side of the arbor at one side of the cutter, an extension on said pressure member shifting the clamp out of the way of the cutter before the cutting operation, and a roller pressing said clamp to its effective position during the cutting operation.

14. In a milling machine having a bed and a cutter supported over said bed, a carrier, means for supporting and guiding said carrier along said bed beneath the cutter, work supporting and positioning means on said carrier, a work clamping member pivoted on said carrier on an axis extending transversely of the carrier and adjacent to the leading edge thereof, means normally urging said clamping member to upright position, and a pressure member engaging said clamping member upon forward movement of said carrier beneath said cutter to pivot the member rearwardly into overlying relation to said work supporting means to clamp a work piece in position thereon.

15. In a machine tool having a bed and a tool arbor rotatably mounted on an axis extending over said bed, a channel shaped member having a horizontal and upstanding portions mounted on said bed and extending longitudinally thereof under said arbor, means on the upstanding portions of said channel forming slideways, a work carrier having seats at opposite sides thereof conforming in shape to said means so that the carrier may slide longitudinally thereon, and means for distorting the upstanding portions relative to the horizontal portion of said channel to adjust the slideways toward or away from each other to compensate for wear.

FRED R. SWANSON.